(12) United States Patent
Chen (10) Patent No.: US 8,226,164 B2
(45) Date of Patent: Jul. 24, 2012

(54) CHILD SAFETY SEAT

(75) Inventor: Ying-Zhong Chen, Taipei (TW)

(73) Assignee: Excellerate Enterprise Co., Ltd., Songshan District, Taipei (TW)

( * ) Notice: Subject to any disclaimer, the term of this patent is extended or adjusted under 35 U.S.C. 154(b) by 317 days.

(21) Appl. No.: 12/556,575

(22) Filed: Sep. 10, 2009

(65) Prior Publication Data
US 2010/0060053 A1 Mar. 11, 2010

Related U.S. Application Data

(60) Provisional application No. 61/095,630, filed on Sep. 10, 2008.

(51) Int. Cl.
*A47C 1/08* (2006.01)
(52) U.S. Cl. ............... 297/256.13; 297/256.16; 297/130
(58) Field of Classification Search ............... 297/250.1, 297/256.1, 256.13, 256.16
See application file for complete search history.

(56) References Cited

U.S. PATENT DOCUMENTS

| | | | |
|---|---|---|---|
| 5,098,157 A | 3/1992 | Surot | |
| 5,645,317 A | 7/1997 | Onishi | |
| 5,890,762 A * | 4/1999 | Yoshida | 297/256.13 |
| 6,428,099 B1 | 8/2002 | Kain | |
| 6,478,377 B2 | 11/2002 | Kassai | |
| 6,746,080 B2 * | 6/2004 | Tsugimatsu et al. | 297/256.13 |
| 6,811,216 B2 | 11/2004 | Sedlack | |
| 6,834,915 B2 * | 12/2004 | Sedlack | 297/256.13 |
| 7,055,903 B2 | 6/2006 | Balensiefer | |
| 7,059,677 B2 * | 6/2006 | Balensiefer et al. | 297/256.13 |
| 7,073,859 B1 | 7/2006 | Wilson | |
| 7,207,628 B2 * | 4/2007 | Eros | 297/297 |
| 7,246,852 B2 | 7/2007 | Balensiefer | |
| 7,370,912 B2 | 5/2008 | Williams | |
| 7,452,031 B2 | 11/2008 | Woellert | |
| 7,547,066 B2 | 6/2009 | Mendenhall | |
| 7,625,043 B2 | 12/2009 | Hartenstine | |
| 7,901,003 B2 | 3/2011 | Meeker | |
| 7,954,895 B2 * | 6/2011 | Freeman et al. | 297/250.1 |
| 2002/0017597 A1 | 2/2002 | Raum | |
| 2002/0043837 A1 | 4/2002 | Kain | |
| 2004/0124678 A1 | 7/2004 | Williams | |
| 2004/0189068 A1 | 9/2004 | Meeker | |
| 2004/0221679 A1 | 11/2004 | Raum | |

(Continued)

FOREIGN PATENT DOCUMENTS

CN 201161560 Y 12/2008

(Continued)

*Primary Examiner* — Laurie Cranmer
(74) *Attorney, Agent, or Firm* — Winston Hwu; Scott Margo (57) ABSTRACT

A child safety seat includes a base, a seat body and an engaging mechanism. The seat body has a rib structure. The rib structure is movably disposed in a guide-slot structure of the base so that the seat body is capable of sliding relative to the base. The engaging mechanism includes a first engaging part and a driving device. The first engaging part is movably disposed on the seat body for engaging with a tooth-shaped structure of the base. The driving device is movably connected to the first engaging part and is movably installed on the seat body so that the driving device is capable of moving between a releasing position and a locking position relative to the seat body. Thus, when the driving device moves relative to the seat body, the driving device can drive the first engaging part to alternatively engage with or separate from the tooth-shaped structure.

17 Claims, 9 Drawing Sheets

U.S. PATENT DOCUMENTS

| | | |
|---|---|---|
| 2007/0057545 A1 | 3/2007 | Hartenstine |
| 2007/0057547 A1 | 3/2007 | Hartenstine |
| 2007/0120403 A1 | 5/2007 | Drexler |
| 2008/0018152 A1 | 1/2008 | Vadai |
| 2008/0111412 A1 | 5/2008 | Woellert |

FOREIGN PATENT DOCUMENTS

| | | | |
|---|---|---|---|
| DE | 42 04 228 A1 | | 8/1993 |
| EP | 0 609 889 A1 | | 8/1994 |
| EP | 609889 A1 | * | 8/1994 |
| EP | 631903 A1 | * | 1/1995 |
| EP | 1 033 280 A2 | | 9/2000 |
| EP | 1 122 120 A1 | | 8/2001 |
| EP | 1 033 280 A3 | | 11/2002 |
| EP | 1 593 545 A2 | | 11/2005 |
| EP | 1 621 395 A2 | | 2/2006 |
| EP | 1 593 545 A3 | | 6/2007 |
| EP | 2 004 449 A2 | | 10/2007 |
| EP | 1 621 395 A3 | | 4/2009 |

* cited by examiner

CHILD SAFETY SEAT

CROSS REFERENCE TO RELATED APPLICATIONS

This application claims the benefit of U.S. Provisional Application No. 61/095,630, which was filed on Sep. 10, 2008 and is incorporated herein by reference.

BACKGROUND OF THE INVENTION

1. Field of the Invention

The present invention relates to a child safety seat, and more specifically, to a child safety seat capable of adjusting reclining angle of seat.

2. Description of the Prior Art

In general, to ensure safety of a child while traveling in car, many countries have legislated there has to be a child safety seat installed in the car for securing the child.

There is usually an angle adjusting mechanism disposed on a child safety seat, which can be selectively in an upright state or an oblique state according to a child's needs. However, the said angle adjusting mechanism usually requires a complicated structure so as to result in a complicated assembly process and an increase of the manufacturing cost of the child safety seat.

Furthermore, some bad structural designs may cause a user incapable of completing the angle adjusting process of the child safety seat with one single hand, or may require great effort of the user. Thus, it is difficult for a user to complete the angle adjustment process of the child safety seat in a narrow car space, especially for a female user.

SUMMARY OF THE INVENTION

The present invention provides a child safety seat comprising a base, a guide-slot structure and a tooth-shaped structure being formed on the base; a seat body having a rib structure, the rib structure being movably disposed in the guide-slot structure so that the seat body is capable of sliding relative to the base; and an engaging mechanism disposed between the seat body and the base, the engaging mechanism comprising a first engaging part movably disposed on the seat body for engaging with the tooth-shaped structure; and a driving device movably connected to the first engaging part and movably installed on the seat body for moving between a releasing position and a locking position relative to the seat body; wherein the driving device drives the first engaging part to alternatively engage with or separate from the tooth-shaped structure when moving relative to the seat body.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
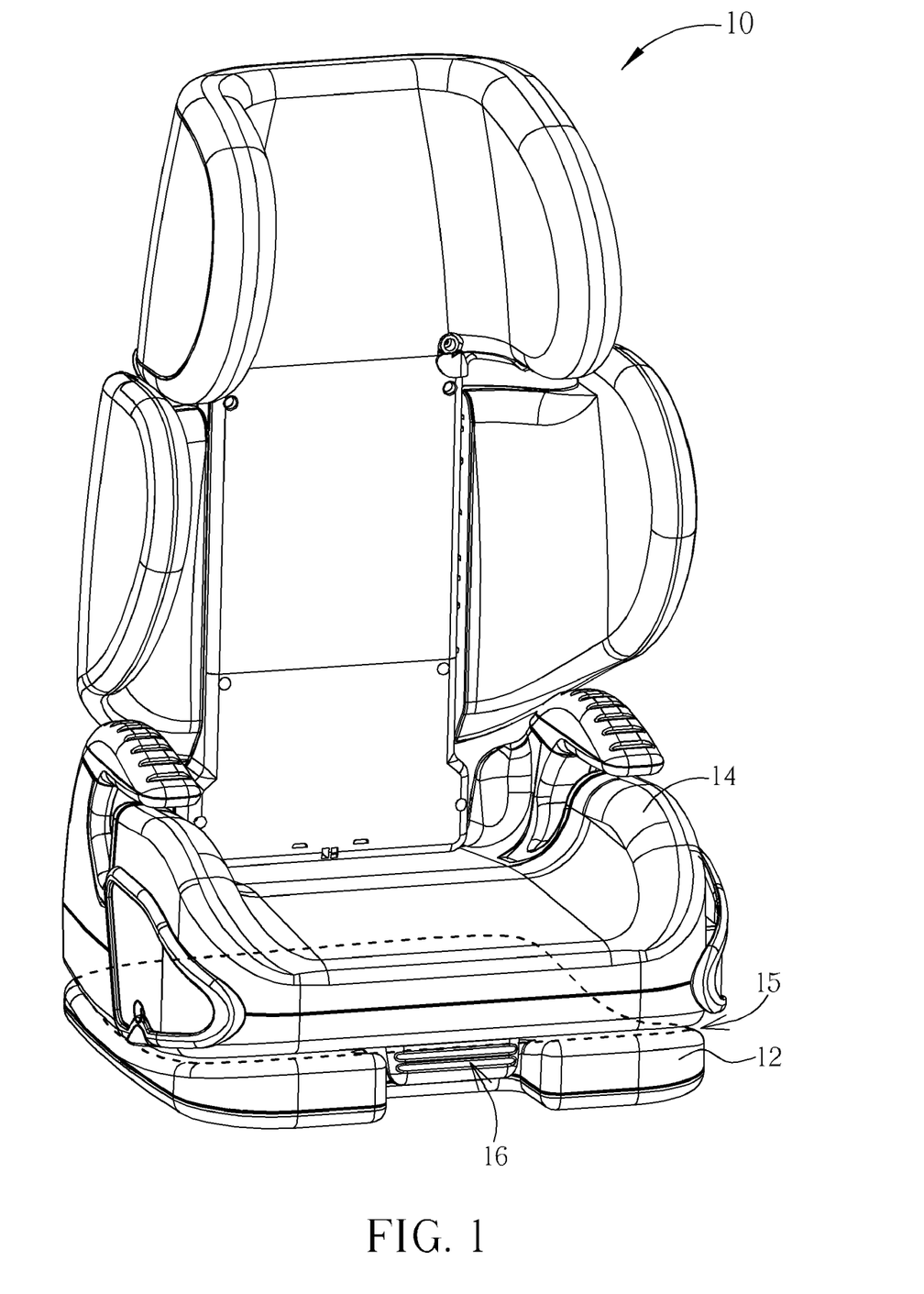
FIG. 1 is a diagram of a child safety seat according to a preferred embodiment of the present invention.

Please refer to FIG. 1, which is a diagram of a child safety seat 10 according to a preferred embodiment of the present invention. The child safety seat 10 includes a base 12, a seat body 14, and an engaging mechanism 16. In the following, more detailed description for each component of the child safety seat 10 is provided.

Figure 2:
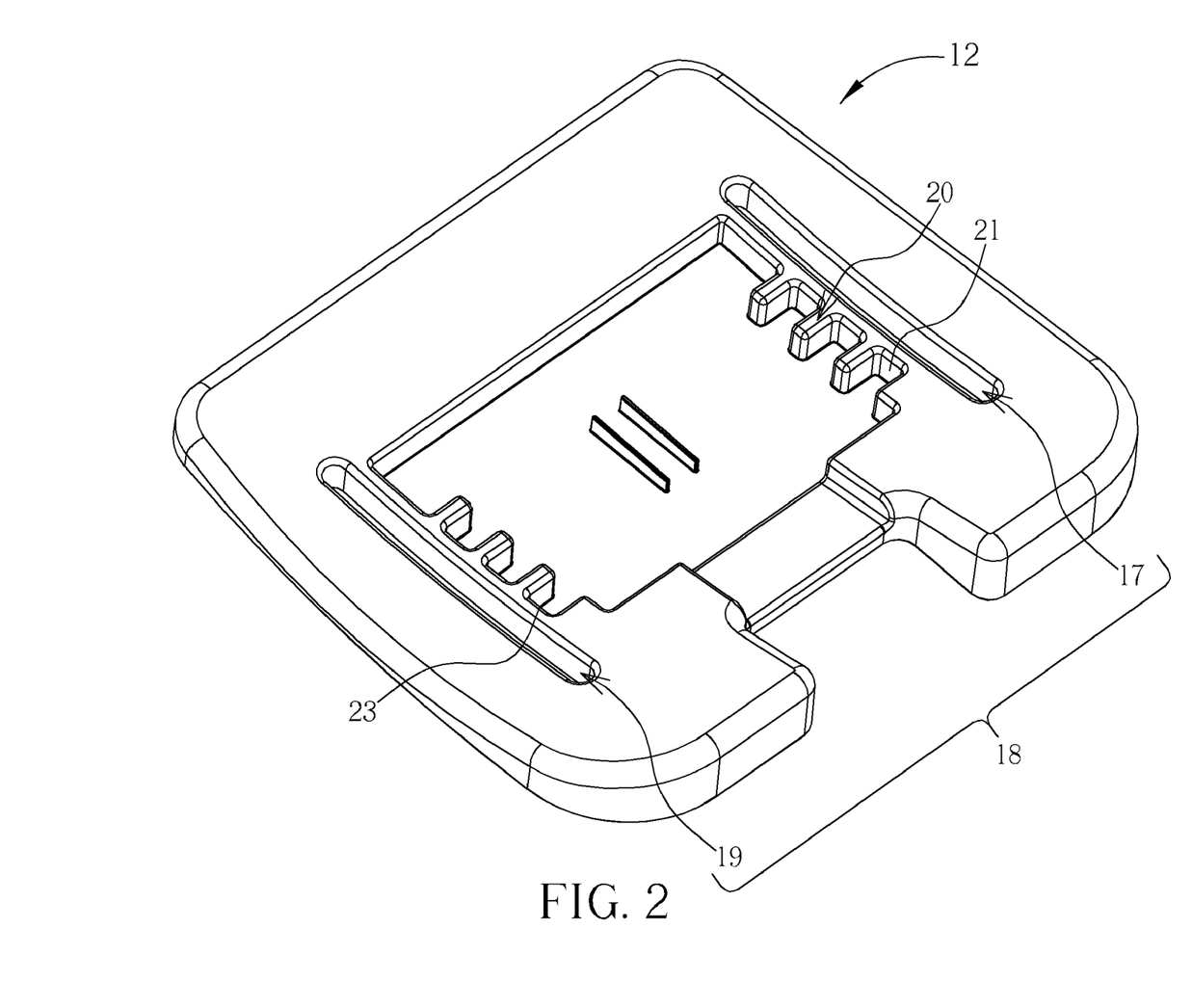
FIG. 2 is a diagram of the base in FIG. 1.
Figure 3:
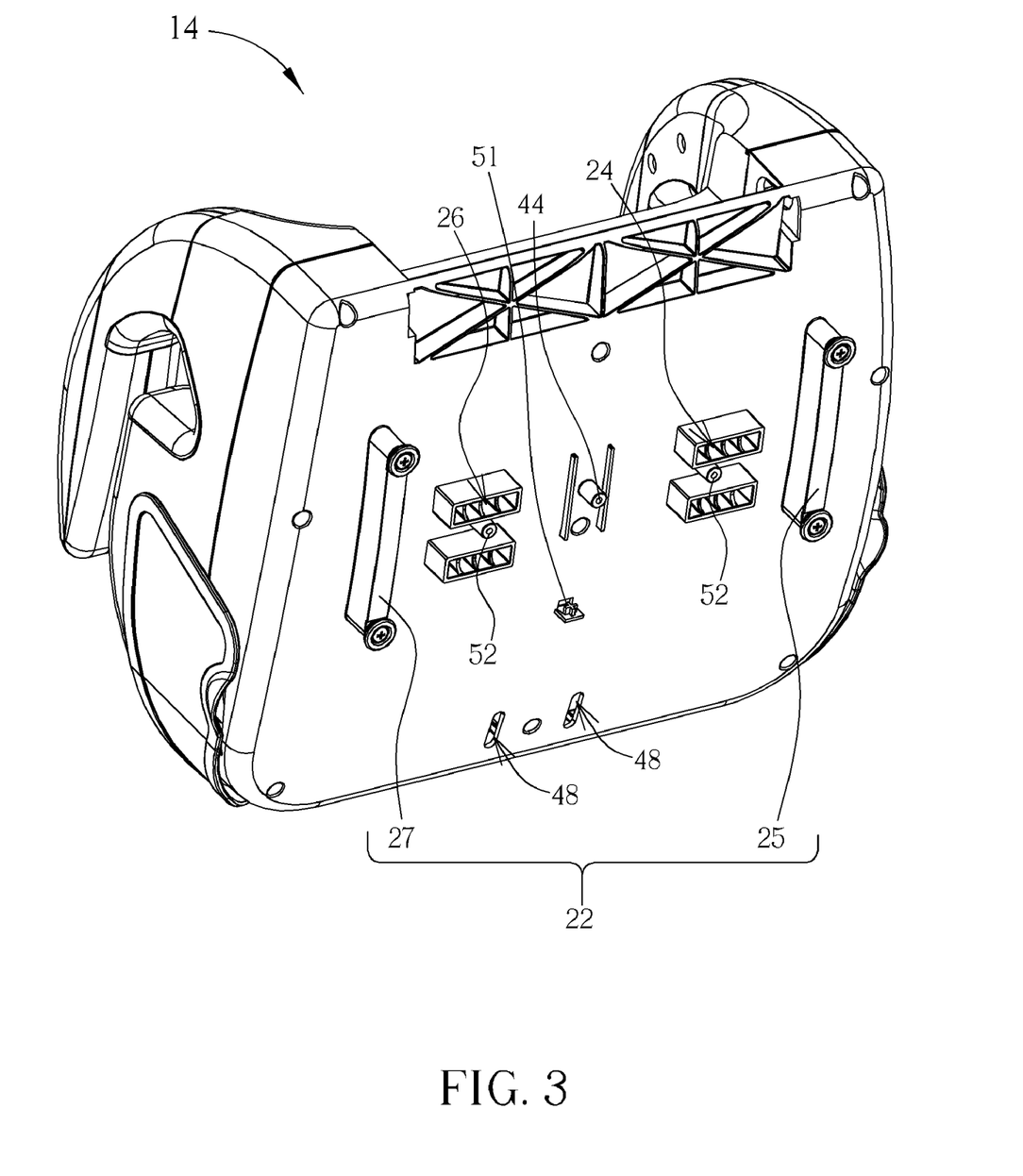
FIG. 3 is a diagram of the seat body in FIG. 1.

Please refer to FIG. 2, which is a diagram of the base 12 in FIG. 1. As shown in FIG. 2, a guide-slot structure 18 and a tooth-shaped structure 20 are formed on the base 12. The guide-slot structure 18 preferably includes a first guide slot 17 and a second guide slot 19. The first guide slot 17 and the second guide slot 19 are formed on two sides of the tooth-shaped structure 20, respectively. The tooth-shaped structure 20 preferably has a plurality of first positioning grooves 21 (three shown in FIG. 2) and a plurality of second positioning grooves 23 (three shown in FIG. 2). Next, please refer to FIG. 3, which is a diagram of the seat body 14 in FIG. 1. As shown in FIG. 3, a rib structure 22 is formed on the seat body 14. The rib structure 22 preferably includes a first rib 25 and a second rib 27, which are symmetrical to each other. The first rib 25 and the second rib 27 are movably disposed in the first guide slot 17 and the second guide slot 19 in FIG. 2, respectively. Thus, the seat body 14 can slide relative to the base 12.

Figure 4:
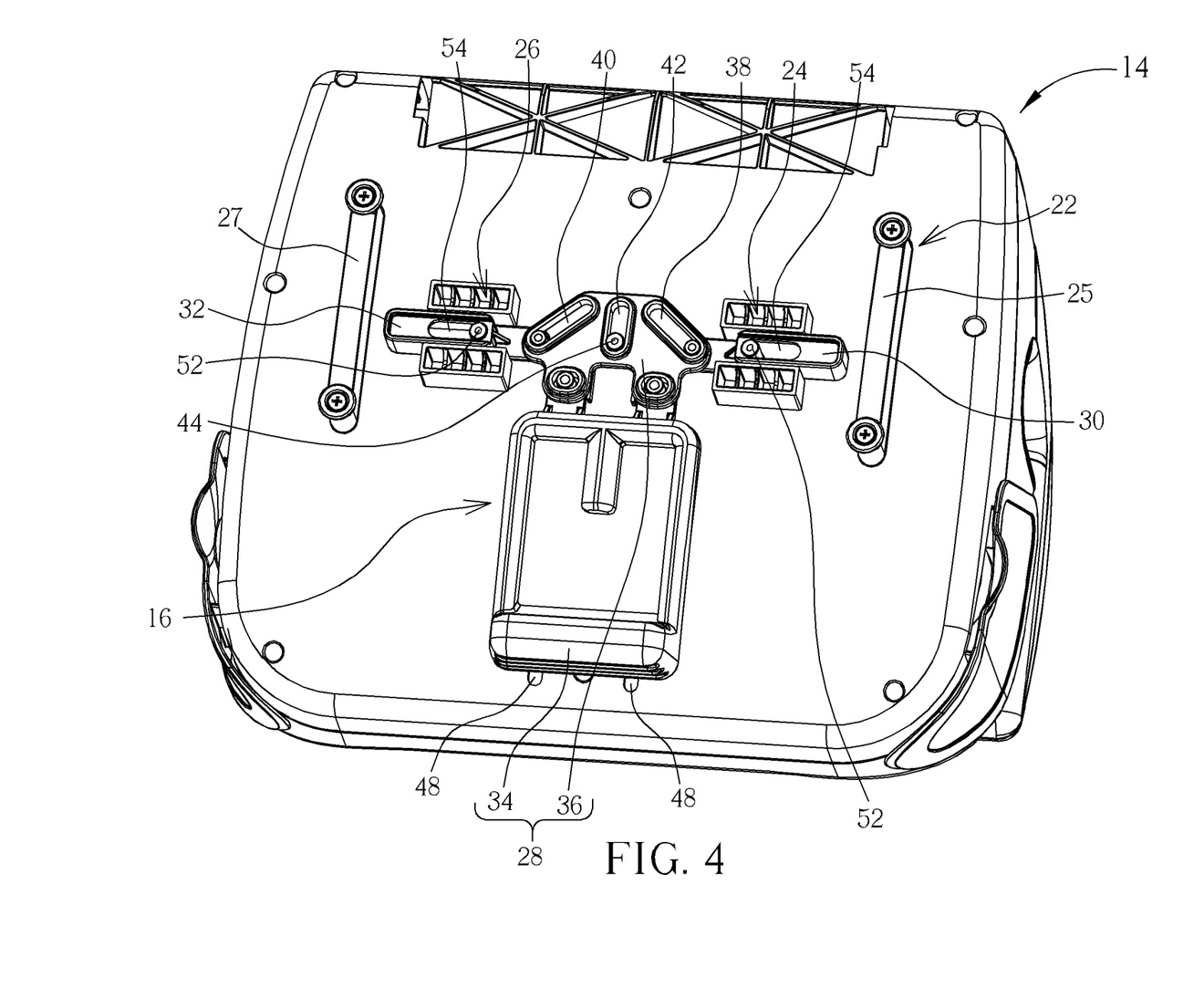
FIG. 4 is a diagram of the engaging mechanism in FIG. 1 being disposed on the seat body.

Next, please refer to FIG. 1 and FIG. 4. FIG. 4 is a diagram of the engaging mechanism 16 in FIG. 1 being disposed on the seat body 14. As shown in FIG. 1, the engaging mechanism 16 is disposed between the seat body 14 and the base 12. As shown in FIG. 4, the engaging mechanism 16 includes a driving device 28, a first engaging part 30, and a second engaging part 32. The driving device 28 includes a pulling part 34 and a connecting part 36. In this embodiment, the pulling part 34 may preferably be a handle. The connecting part 36 is connected to the pulling part 34, and a first oblique slot 38 and a second oblique slot 40 are formed on the connecting part 36. The first engaging part 30 is movably disposed on the seat body 14.

As shown in FIG. 3, the seat body 14 preferably includes a first guide rail 24 and a second guide rail 26. The first engaging part 30 is movably disposed in the first guide rail 24. One end of the first engaging part 30 is movably connected to the first oblique slot 38. In this embodiment, the first guide rail 24 is a pair of rails where the first engaging part 30 is located therebetween, but is not limited to. For example, the first guide rail 24 may also be a single rail where the first engaging part 30 is slidably disposed. Similarly, the second engaging part 32 is disposed in the second guide rail 26 of the seat body 14, and one end of the second engaging part 32 is movably connected to the second oblique slot 40. The first engaging part 30 and the second engaging part 32 are used for engaging with one of the first positioning grooves 21 and one of the second positioning grooves 23 of the tooth-shaped structure 20, respectively.

When the driving device 28 moves relative to the seat body 14, the first oblique slot 38 and the second oblique slot 40 of the connecting part 36 drive the first engaging part 30 and the second engaging part 32 with motion of the pulling part 34, respectively. In other words, the first engaging part 30 and the second engaging part 32 may be guided by the first guide rail 24 and the second guide rail 26, respectively. Furthermore, via guidance of the first oblique slot 38 and the second oblique slot 40, motion directions of the first engaging part 30 and the second engaging part 32 can be different from that of the driving device 28.

In this embodiment, the motion directions of the first engaging part 30 and the second engaging part 32 are substantially perpendicular to that of the driving device 28. When the pulling part 34 is pulled, the first engaging part 30 and the second engaging part 32 are accordingly driven to approach to each other.

Furthermore, as shown in FIG. 4, a limit slot 42 is formed on the connecting part 36. The seat body 14 includes a second protruding pillar 44. The second protruding pillar 44 is disposed in the limit slot 42 for constraining motion range of the connecting part 36 relative to the seat body 14, such as constraining the connecting part 36 to move linearly relative to the seat body 14.

Figure 5:
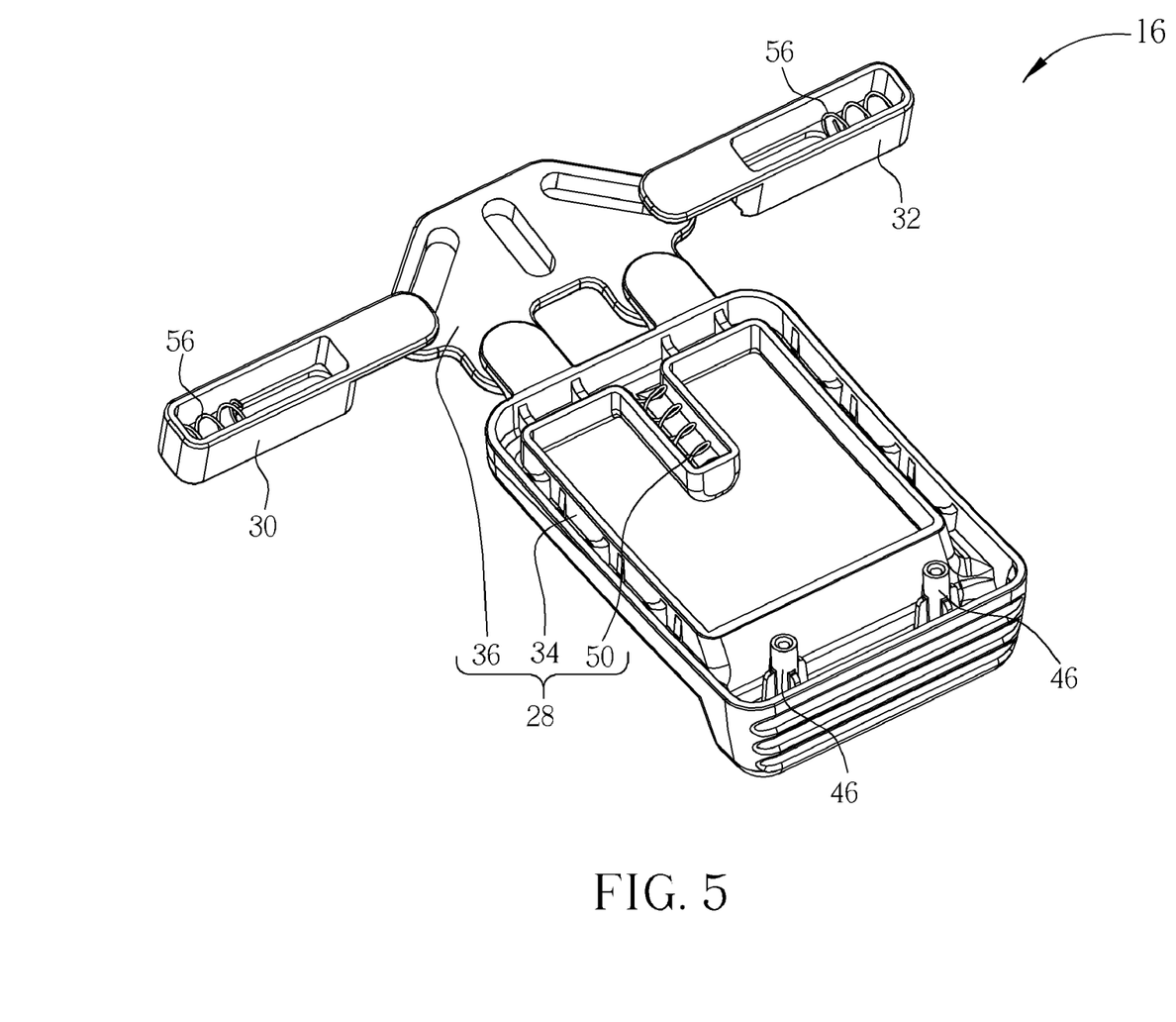
FIG. 5 is a diagram of the engaging mechanism in FIG. 1.

Please refer to FIG. 5, which is a diagram of the engaging mechanism 16 in FIG. 1. As shown in FIG. 5, the pulling part 34 includes at least one protruding pillar 46 (preferably two in this embodiment). The protruding pillar 46 is disposed in the corresponding limit slot 48 of the seat body 14 in FIG. 4 for constraining motion range of the pulling part 34 relative to the seat body 14. In this embodiment, the limit slot 48 is used for constraining the pulling part 34 to move linearly relative to the seat body 14. That is, the present invention utilizes assembly of the second protruding pillar 44 and the limit slot 42 and assembly of the protruding pillar 46 and the limit slot 48 to constrain motion range of the driving device 28 relative to the seat body 14. Thus, the present invention may allow the user to pull the driving device 28 to move within a proper range so as to prevent damage of the child safety seat 10 caused by wrong operations or excessive manual forces.

Furthermore, as shown in FIG. 5, the driving device 28 further includes a first spring 50 disposed in the pulling part 34 and abutting against the seat body 14. The first spring 50 is used for providing the pulling part 34 with elastic force so as to drive the driving device 28 to move back automatically when the driving device 28 moves relative to the seat body 14. The seat body 14 preferably has a positioning pillar 51 (as shown in FIG. 3). One end of the first spring 50 is disposed on the positioning pillar 51.

Furthermore, as shown in FIG. 4 and FIG. 5, the seat body 14 further includes a first protruding pillar 52 disposed in the limit slot 54 of the first engaging part 30, and the driving device 28 further includes a second spring 56 disposed in the first engaging part 30 and abutting against the first protruding pillar 52. The second spring 56 is used for proving elastic force to the first engaging part 30 when the first engaging part 30 is engaged with one of the first positioning grooves 21 of the tooth-shaped structure 20, so that the first engaging part 30 may be positioned in the first positioning groove 21 of the tooth-shaped structure 20 more firmly. As for structural design of the second engaging part 32, the related description is therefore omitted herein since it is the same as that of the first engaging part 30.

Figure 6:
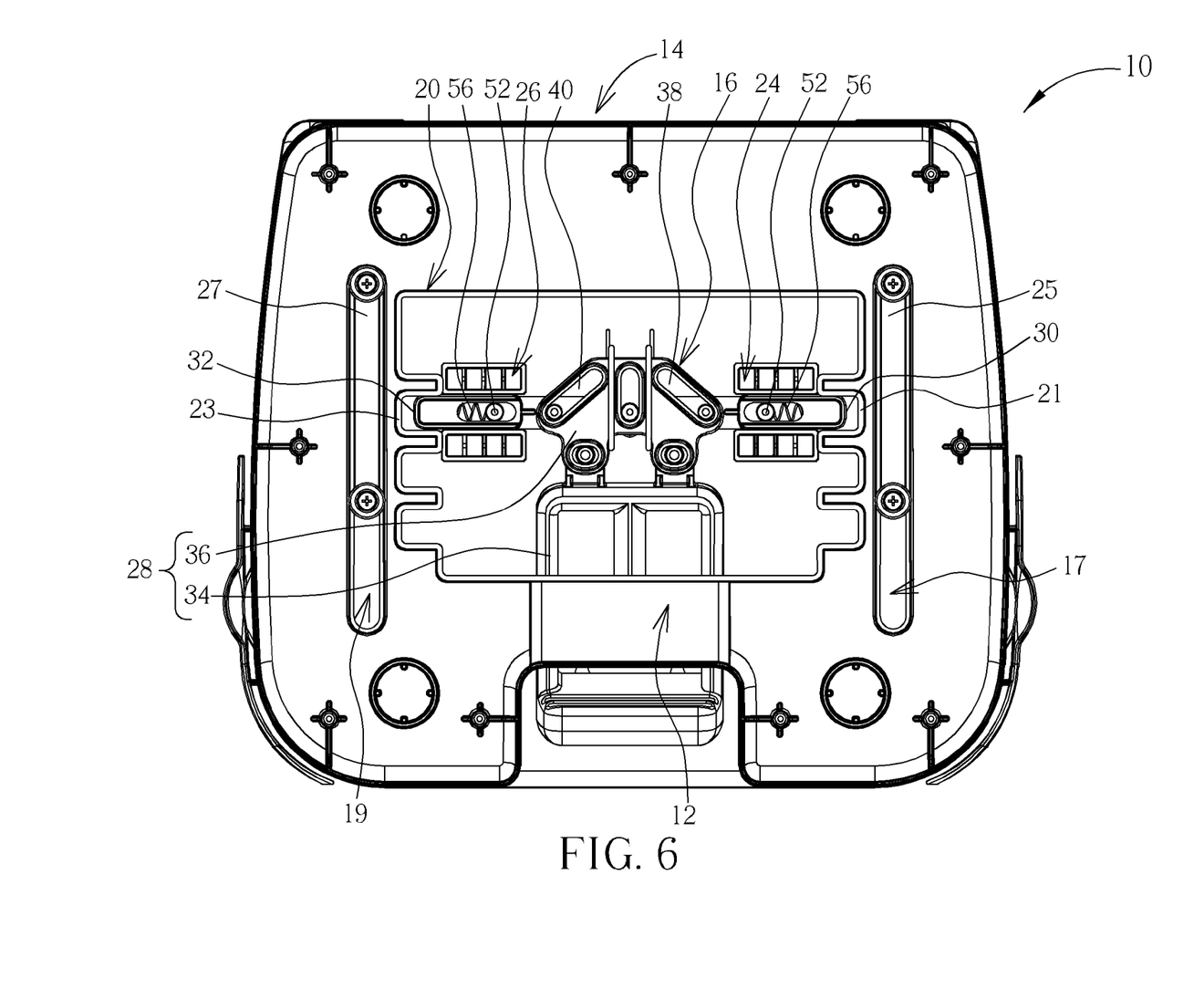
FIG. 6 is a diagram of the engaging mechanism in FIG. 5 being disposed between the base and the seat body.
Figure 7:
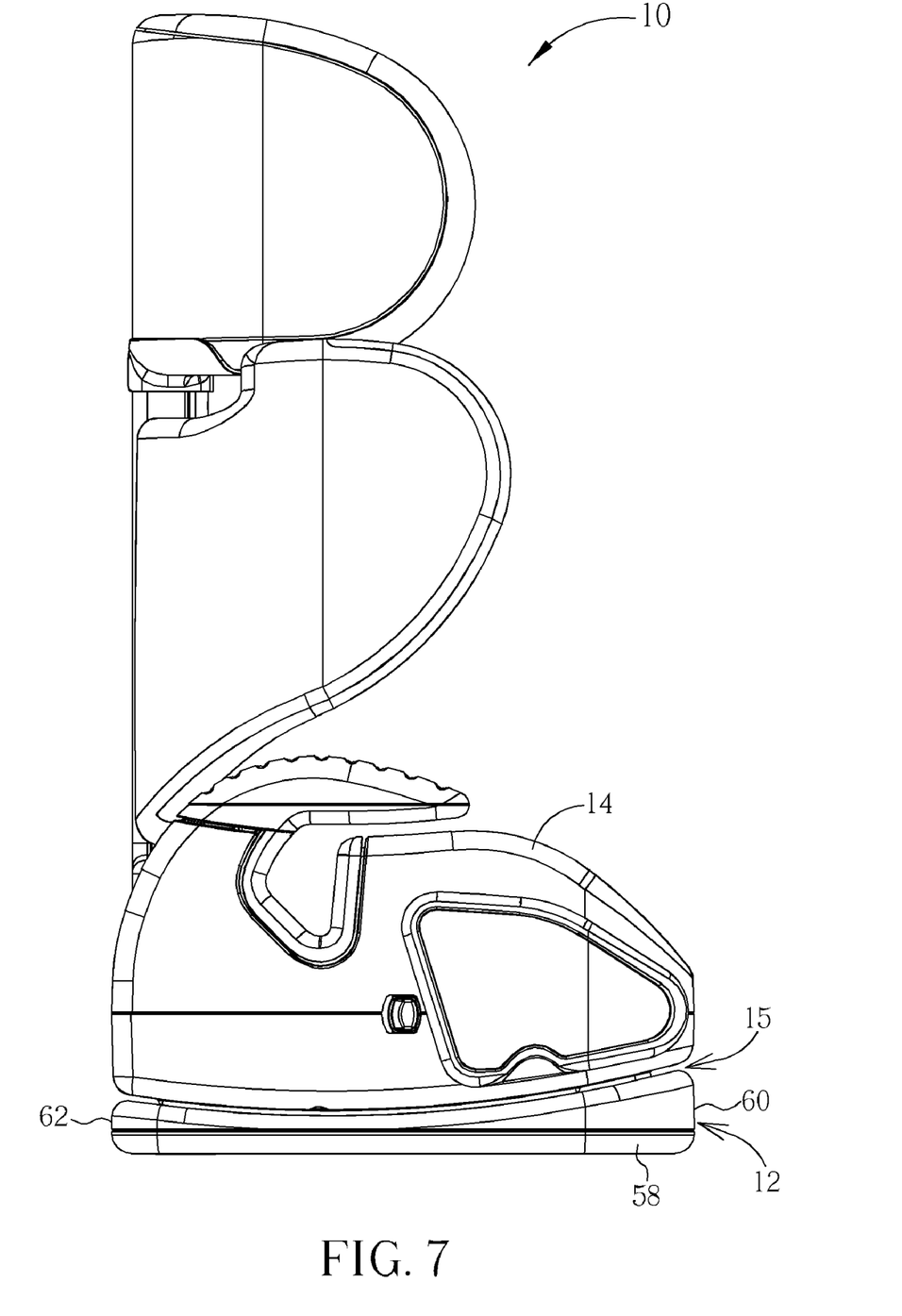
FIG. 7 is a side view of the child safety seat when the engaging mechanism in FIG. 6 is engaged with the base.

More detailed description for the base 12, the seat body 14, and the engaging mechanism 16 is provided as follows. Please refer to FIG. 6 and FIG. 7. FIG. 6 is a diagram of the engaging mechanism 16 in FIG. 5 being disposed between the base 12 and the seat body 14. FIG. 7 is a side view of the child safety seat 10 when the engaging mechanism 16 in FIG. 6 is engaged with the base 12. When the driving device 28 moves to a locking position as shown in FIG. 6 relative to the seat body 14, the first engaging part 30 and the second engaging part 32 are engaged with the first positioning groove 21 and the second positioning groove 23 in the tooth-shaped structure 20, respectively.

At this time, the first engaging part 30 and the second part 32 can be positioned in the first positioning groove 21 and the second positioning groove 23 firmly by elastic force provided from the second springs 56. Thus, via engagement of the first engaging part 30 and the first positioning groove 21 and engagement of the second engaging part 32 and the second positioning groove 23, the child safety seat 10 can constrain motion of the first rib 25 relative to the first guide slot 17 and motion of the second rib 27 relative to the second guide slot 19, so that the seat body 14 can be fixed at a position as shown in FIG. 7. In such a manner, a child may sit on the child safety seat 10 comfortably since the child safety seat 10 can provide the child's back with a proper support.

Figure 8:
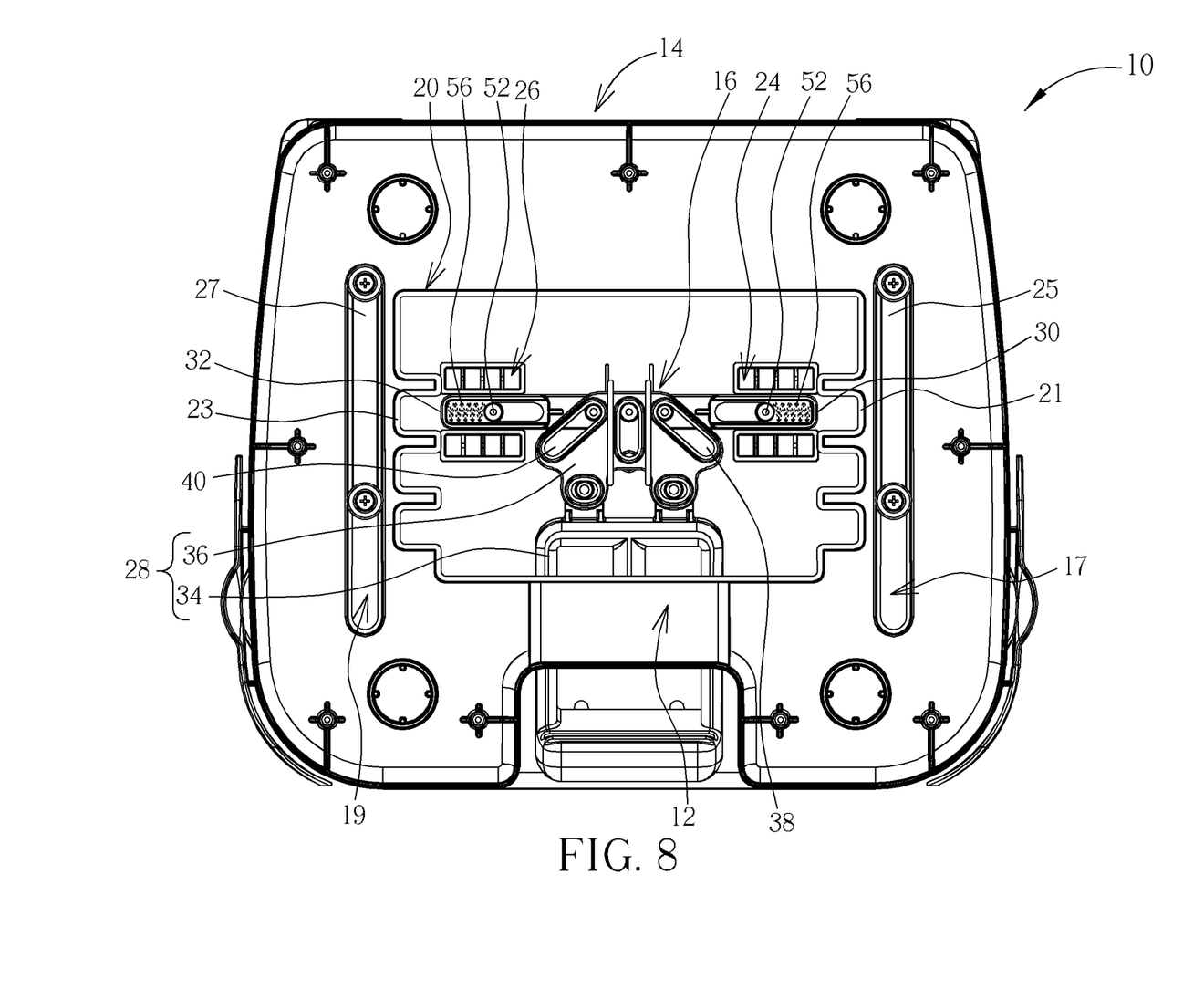
FIG. 8 is a diagram of the driving device in FIG. 6 moving to a releasing position relative to the seat body.
Figure 9:
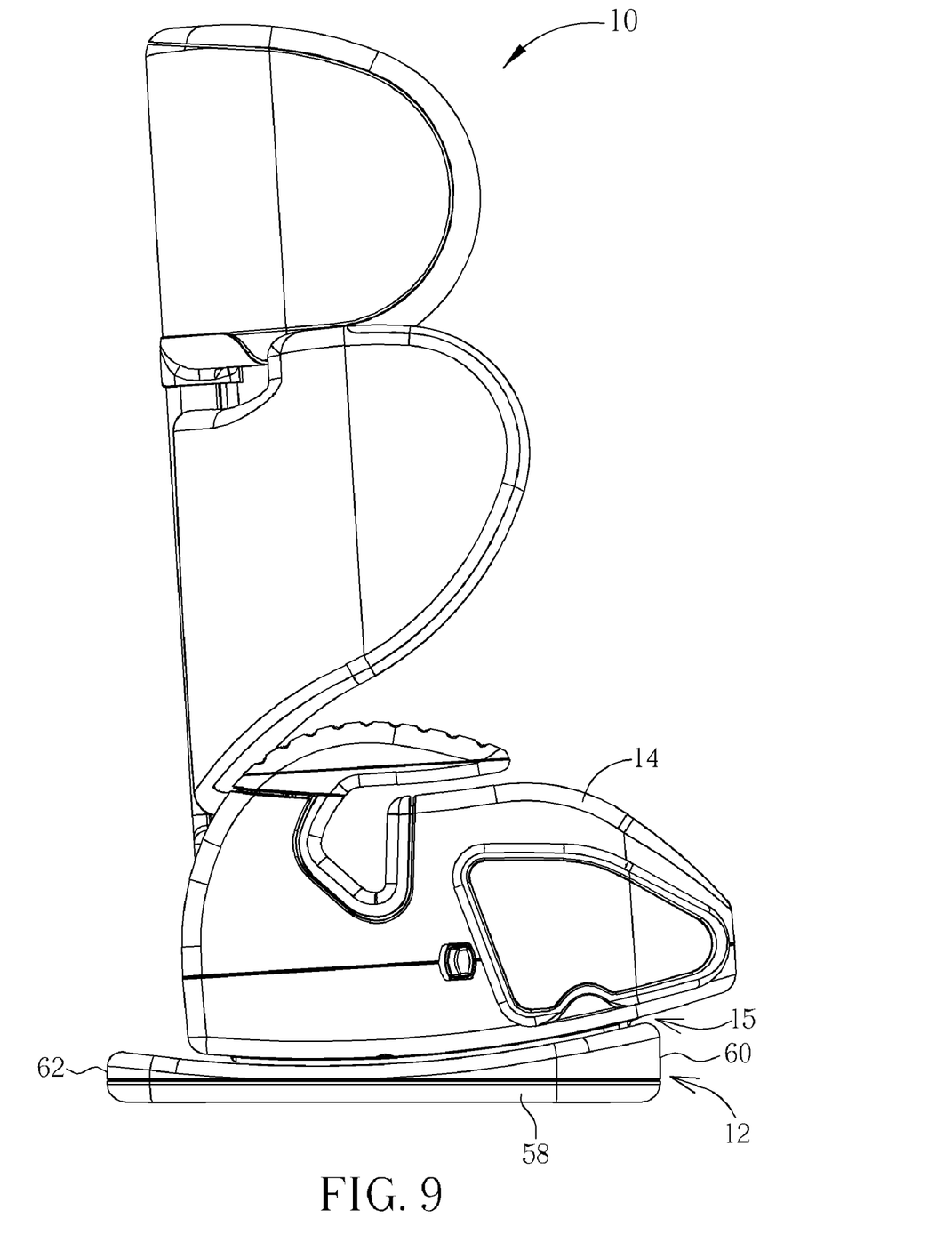
FIG. 9 is a side view of the child safety seat in FIG. 7 after the seat body slides relative to the base.

Next, please refer to FIG. 8 and FIG. 9. FIG. 8 is a diagram of the driving device 28 in FIG. 6 moving to a releasing position relative to the seat body 14. FIG. 9 is a side view of the child safety seat 10 in FIG. 7 after the seat body 14 slides relative to the base 12. When a user wants to adjust a reclining angle of the seat body 14 relative to the base 12 for causing the child to lie in the child safety seat 10 more comfortably, the user just needs to pull the pulling part 34 to move the driving device 28 to the releasing position as shown in FIG. 8 (at this time, the first spring 50 in FIG. 5 is compressed).

At this time, with motion of the driving device 28 towards the releasing position, the first oblique slot 38 drives the first engaging part 30 to move along the first guide rail 24, and the second oblique slot 40 drives the second engaging part 32 to move along the second guide rail 26, until the first engaging part 30 and the second engaging part 32 separate from the first positioning groove 21 and the second positioning groove 23, respectively (at this time, the second spring 56 is compressed).

As shown in FIG. 8, since the first engaging part 30 is no more engaged with the first positioning groove 21 and so is the second engaging part 32, the first rib 25 and the second rib 27 can slide relative to the first guide slot 17 and the second guide slot 19, respectively. In other words, the user can push the seat body 14 to slide relative to the base 12 when pulling the driving device 28 to the releasing position. Furthermore, as shown in FIG. 1, in this embodiment, a connecting surface 15 between the base 12 and the seat body 14 is preferably an arc surface (depicted by a dotted line in FIG. 1). That is, as shown in FIG. 7 and FIG. 9, an upper edge of a lateral side 58 of the base 12 is an arc. Furthermore, a front edge 60 and a rear edge 62 of the lateral side 58 have different heights. In such a manner, the seat body 14 can slide relative to the base 12 in different reclining angles. In the present invention, the height of the front edge 60 is preferably greater than that of the back edge 62. Thus, when the seat body 14 is pushed forward, the reclining angle of the seat body 14 varies mildly; otherwise, when the seat body 14 is pushed backward, the reclining angle of the seat body 14 varies more apparently.

Finally, when the first engaging part 30 and the second engaging part 32 move to positions corresponding to another first positioning groove 21 and another second positioning groove 23, respectively (as shown in FIG. 9, for example), the user may release the pulling part 34 so that the driving device 28 can be moved back to the locking position by elastic force provided from the first spring 50.

With motion of the driving device 28 back to the locking position, the first oblique slot 38 may correspondingly drive the first engaging part 30 to move along the first guide rail 24 until the first engaging part 30 is engaged with the corresponding first positioning groove 21. At the same time, the second oblique slot 40 may also drive the second engaging part 32 to move along the second guide rail 26 until the second engaging part 32 is engaged with the corresponding second positioning groove 23. In such a manner, when the driving device 28 moves back to the locking position, the seat body 14 may simultaneously be fixed at a position as shown in FIG. 9 relative to the base 12, so as to finish the angle adjustment process of the child safety seat 10.

As shown in FIG. 6 and FIG. 8, the seat body 14 can be adjusted in three different positions via the tooth-shaped structure 20. In the present invention, the tooth-shaped structure 20 is not limited to the said structural design, meaning that number of positioning grooves of the tooth-shaped structure 20 may vary with practical applications and manufacturing requirements of the child safety seat 10. Furthermore, the length of the guide-slot structure 18 may constrain the slide distance of the seat body 14 relative to the base 12, so that reclining-angle adjustment of the seat body 14 relative to the base 12 may be limited within a proper range for preventing wrong operations (e.g. overturning of the child safety seat 10).

Afterwards, if the user wants to adjust the reclining angle of the seat body 14 relative to the base 12 again, the user may repeat the said process to make the first engaging part 30 and the second engaging part 32 separate from the tooth-shaped structure 20, so that the seat body 14 is capable of sliding relative to the base 12 again. Subsequently, the user can push the seat body 14 to a proper reclining position relative to the base 12 according to the child's needs, so as to make the child lie in the child safety seat 10 more comfortably. For example, when the child is falling asleep, the user may pull the pulling part 34 of the driving device 28 to make the first engaging part 30 and the second engaging part 32 separate from the tooth-shaped structure 20, and then push the seat body 14 to a position of a maximum reclining-angle relative to the base 12.

When finishing reclining-angle adjustment of the seat body 14, the user may release the pulling part 34 so that the seat body 14 may be fixed at the said position relative to the base 12 by engagement of the engaging mechanism 16 and the base 12. In such a manner, the child may lie in the child safety seat 10 comfortably.

Compared with the prior art, the child safety seat provided by the present invention can drive the engaging part to engage with or separate from the tooth-shape structure of the base via linkage of the driving device and the engaging part, so that the seat body can slide relative to the base or be fixed at a reclining position relative to the base. In such a manner, the present invention may not only simplify structural design of the child safety seat and reduce the manufacturing cost of the child safety seat due to the aforementioned simple engaging design, but may also allow the user to complete the angle adjustment process of the child safety seat easily through simple operations so that operational convenience of the child safety seat may be increased greatly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A child safety seat comprising:
    a base, a guide-slot structure and a tooth-shaped structure being formed on the base;
    a seat body having a rib structure and a first protruding pillar, the rib structure being movably disposed in the guide-slot structure so that the seat body is capable of sliding relative to the base; and
    an engaging mechanism disposed between the seat body and the base, the engaging mechanism comprising:
        a first engaging part having a limit slot formed thereon and movably disposed on the seat body for engaging with the tooth-shaped structure, the first protruding pillar being slidably disposed in the limit slot of the first engaging part; and
        a driving device movably connected to the first engaging part and movably installed on the seat body for moving between a releasing position and a locking position relative to the seat body, the driving device comprising:
            a pulling part; and
            a connecting part connected to the pulling part, a first oblique slot being formed on the connecting part, the first engaging part being movably connected to an inner portion of the first oblique slot, the first oblique slot pulling the first engaging part away from the tooth-shaped structure when the driving device is located at the releasing position;
        wherein the tooth-shaped structure has a plurality of first positioning grooves, and the first engaging part is engaged with one of the positioning grooves when the driving device is located at the locking position;
    wherein the driving device drives the first engaging part to alternatively engage with or separate from the tooth-shaped structure when moving relative to the seat body.

2. The child safety seat of claim 1, wherein the motion direction of the first engaging part is different from that of the driving device.

3. The child safety seat of claim 2, wherein the motion direction of the first engaging part is substantially perpendicular to that of the driving device.

4. The child safety seat of claim 1, wherein the pulling part comprises a protruding pillar disposed in a limit slot of the seat body.

5. The child safety seat of claim 1, wherein the driving device further comprises:
    a spring disposed in the pulling part and abutting against the seat body for providing the pulling part with elastic force so as to move the driving device from the releasing position back to the locking position.

6. The child safety seat of claim 5, wherein the seat body comprises:
    a positioning pillar, one end of the spring being disposed on the positioning pillar.

7. The child safety seat of claim 1, wherein the pulling part is a handle.

8. The child safety seat of claim 1, wherein the driving device further comprises a spring disposed in the first engaging part and abutting against the first protruding pillar, and the spring is used for providing the first engaging part with elastic force so as to position the first engaging part in one of the first positioning grooves of the tooth-shaped structure.

9. The child safety seat of claim 1, wherein the connecting part has a limit slot formed thereon and the seat body comprises a second protruding pillar disposed in the limit slot of the connecting part.

10. The child safety seat of claim 1, wherein the seat body further comprises a first guide rail and the first engaging part is slidably disposed on the first guide rail.

11. The child safety seat of claim 10, wherein the rib structure comprises a first rib and a second rib, the guide-slot structure comprises a first guide slot and a second guide slot, and the first rib and the second rib are slidably disposed in the first guide slot and the second guide slot, respectively.

12. The child safety seat of claim 11, wherein the engaging mechanism further comprises a second engaging part, a second oblique slot is further formed on the connecting part, the seat body further comprises a second guide rail, and the second engaging part is movably connected to the second oblique slot and is movably disposed in the second guide rail so that the second engaging part is capable of alternatively engaging with or separating from the tooth-shaped structure.

13. The child safety seat of claim 12, wherein the tooth-shaped structure further comprises a plurality of second positioning grooves and the second engaging part is engaged with one of the second positioning grooves when the driving device is located at the locking position.

14. The child safety seat of claim 12, wherein the pulling part drives the first engaging part and the second engaging part to approach to each other when being pulled.

15. The child safety seat of claim 1, wherein an upper edge of a lateral side of the base is an arc.

16. The child safety seat of claim 15, wherein a front side and a back side of the base have different heights.

17. The child safety seat of claim 16, wherein the height of the front side is greater than the height of the back side.

* * * * *